(12) United States Patent
Haase-Schuetz et al.

(10) Patent No.: US 12,524,701 B2
(45) Date of Patent: Jan. 13, 2026

(54) DEVICE AND COMPUTER-IMPLEMENTED METHOD FOR DATA-EFFICIENT ACTIVE MACHINE LEARNING

(71) Applicant: Robert Bosch GmbH, Stuttgart (DE)

(72) Inventors: Christian Haase-Schuetz, Fellbach (DE); Peter Moeller, Heidelberg (DE)

(73) Assignee: Robert Bosch GmbH, Stuttgart (DE)

( * ) Notice: Subject to any disclaimer, the term of this patent is extended or adjusted under 35 U.S.C. 154(b) by 1076 days.

(21) Appl. No.: 17/142,941

(22) Filed: Jan. 6, 2021

(65) Prior Publication Data
US 2021/0216912 A1   Jul. 15, 2021

(30) Foreign Application Priority Data

Jan. 14, 2020 (DE) .......................... 102020200340.8

(51) Int. Cl.
| | | |
|---|---|---|
| *G06N 20/00* | (2019.01) | |
| *G06F 18/211* | (2023.01) | |
| *G06F 18/214* | (2023.01) | |
| *G06F 18/2415* | (2023.01) | |
| *G06F 18/2431* | (2023.01) | |
| *G06V 10/764* | (2022.01) | |
| *G06V 10/776* | (2022.01) | |
| *G06V 10/82* | (2022.01) | |
| *G06N 3/08* | (2023.01) | |

(52) U.S. Cl.
CPC .......... *G06N 20/00* (2019.01); *G06F 18/211* (2023.01); *G06F 18/2155* (2023.01); *G06F 18/2415* (2023.01); *G06F 18/2431* (2023.01); *G06V 10/764* (2022.01); *G06V 10/776* (2022.01); *G06V 10/82* (2022.01); *G06N 3/08* (2013.01)

(58) Field of Classification Search
CPC .......... G06N 20/00; G06N 3/045; G06N 3/08; G06N 7/01; G06F 18/211; G06F 18/2155; G06F 18/2415; G06F 18/2431; G06V 10/764; G06V 10/776; G06V 10/82
See application file for complete search history.

(56) References Cited

U.S. PATENT DOCUMENTS

| | | | | |
|---|---|---|---|---|
| 8,010,357 B2* | 8/2011 | Hakkani-Tur | ...... | G10L 15/1822 704/10 |
| 2020/0320430 A1* | 10/2020 | Kunnumma | ........... | G06N 20/00 |

OTHER PUBLICATIONS

Lakshmipadmaja et al., Classification Performance Improvement Using Random Subset Feature Selection Algorithm for Data Mining, 2018, Big Data Research, vol. 12, pp. 1-12, ISSN 2214-5796, https://doi.org/10.1016/j.bdr.2018.02.007. (Year: 2018).*

(Continued)

*Primary Examiner* — David R Vincent
(74) *Attorney, Agent, or Firm* — Norton Rose Fulbright US LLP

(57) ABSTRACT

A device and a computer-implemented method for data-efficient active machine learning. Annotated data are provided. A model is trained for a classification of the data as a function of the annotated data. The model trained in this way is calibrated, as a function of the annotated data, with regard to confidence for a correctness of the classification of the annotated data by the model. For unannotated data, the confidence for the correctness of the classification of the unannotated data is determined, using the model calibrated in this way. The unannotated data for the active machine learning whose confidence satisfies a criterion is acquired from the unannotated data.

11 Claims, 2 Drawing Sheets

(56) References Cited

OTHER PUBLICATIONS

Li et al., Confidence-based active learning, 2006, IEEE transactions on pattern analysis and machine intelligence. 28. 1251-61. 10.1109/TPAMI.2006.156. (Year: 2006).*

Kull et al., Beta calibration: a well-founded and easily implemented improvement on logistic calibration for binary classifiers, 2017, Proceedings of the 20th International Conference on Artificial Intelligence and Statistics in Proceedings of Machine Learning Research (Year: 2017).*

Guo, C., et al., "On Calibration of Modern Neural Networks," Cornell University, 2017, pp. 1-14. <https://arxiv.org/pdf/1706.04599.pdf> Downloaded Jan. 6, 2021.

Luo, Tong, et al., "Active Learning to Recognize Multiple Types of Plankton," Journal of Machine Learning Research, 2005, pp. 589-613. <https://www.jmlr.org/papers/volume6/luo05a/luo05a.pdf> Downloaded Jan. 6, 2021.

* cited by examiner

DEVICE AND COMPUTER-IMPLEMENTED METHOD FOR DATA-EFFICIENT ACTIVE MACHINE LEARNING

DETAILED DESCRIPTION OF EXAMPLE EMBODIMENTS

Figure 1:
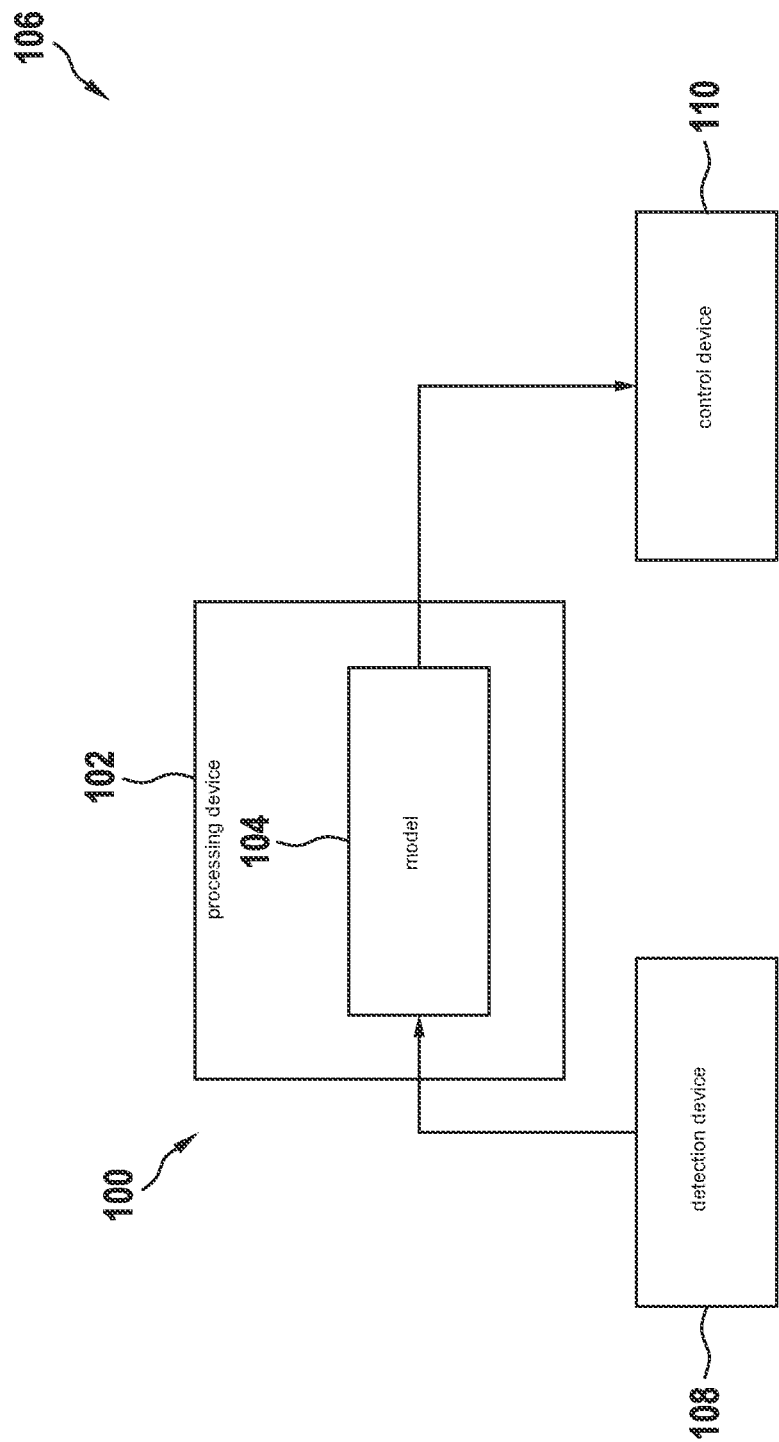
FIG. 1 shows a schematic illustration of a device for active machine learning, in accordance with an example embodiment of the present invention.

Device 100 for active machine learning in accordance with an example embodiment of the present invention, illustrated in FIG. 1 is designed to carry out a method described below.

Device 100 includes a processing device 102, in particular one or multiple processors, and at least one memory for data. Device 100 includes a model 104.

Device 100 may be designed for digital image processing in which digital images are classified by model 104. In the following discussion, an acquisition function that is based on model 104 is used. In the example, model 104 is a single deep neural network. Model 104 may also be formed from multiple in particular deep neural networks, or may have some other architecture.

A system 106 for machine learning may include device 100, a detection device 108 for detecting digital images, and a control device 110 for a machine. System 106 may be designed to control the machine into a class of multiple classes as a function of a classification of a detected digital image. The machine may be a vehicle or a robot. Instead of a classification of digital images, classification for a detection of objects in sensor measurements or for voice-to-text conversions may be provided. Instead of detecting digital images, general sensor measurements, such as 3D sensor measurements by radar or LIDAR sensors, for example, may be used.

Figure 2:
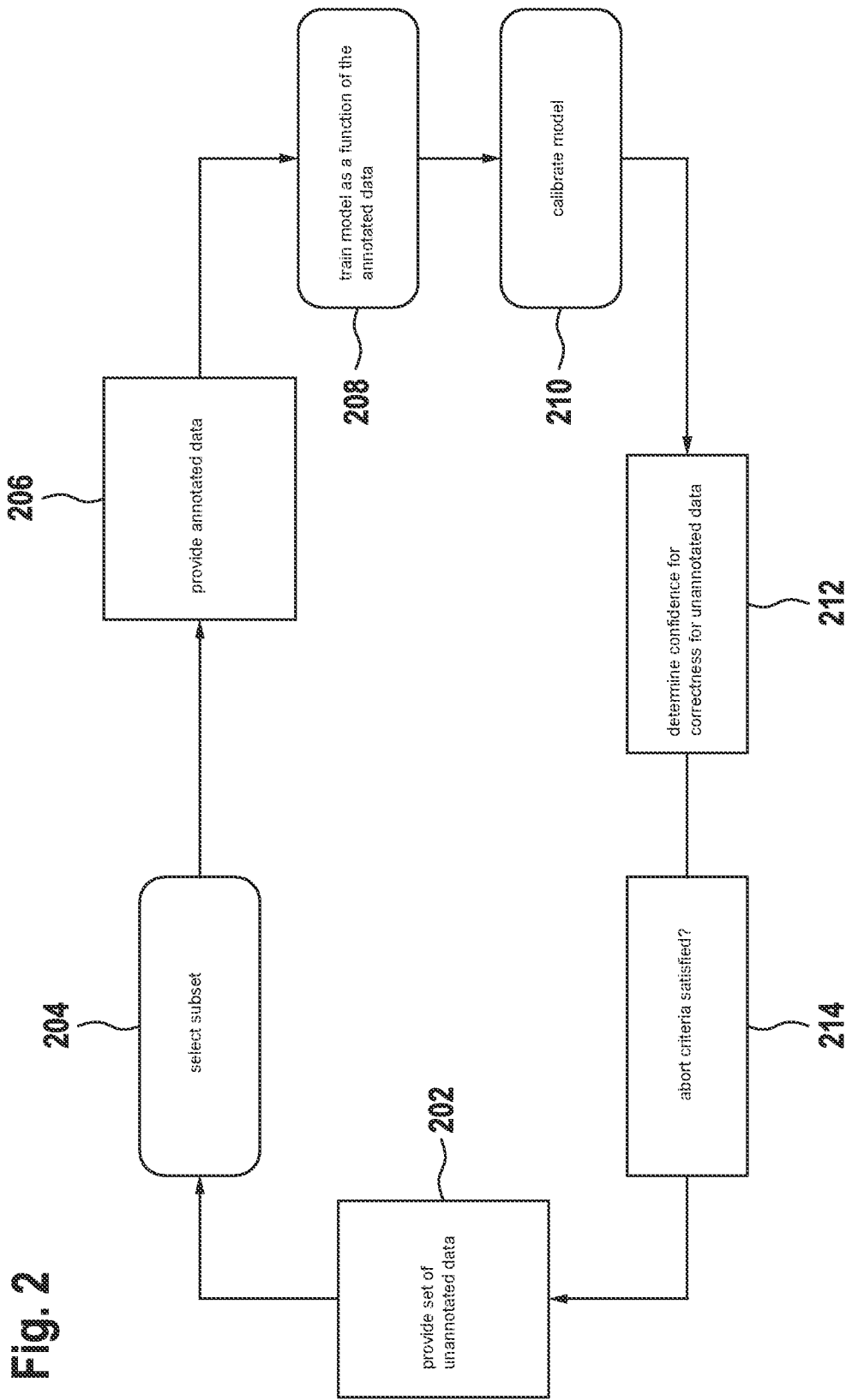
FIG. 2 shows steps in a method for active machine learning, in accordance with an example embodiment of the present invention.

A computer-implemented method for active machine learning is described with reference to FIG. 2. Model 104 is trained using the method, and may be subsequently used in system 106. The method assumes that the architecture of model 104 is fixed and parameters of model 104 are already initialized. In the example, model 104 is a deep neural network whose hyperparameter defines an input layer, an output layer, and a plurality of hidden layers in between. The parameters of the deep neural network are determined as follows.

Deep neural networks in particular may be poorly calibrated. To determine a suitable calibration, the expected proportion of correct predictions is compared to the empirical proportion of correct predictions, based on the confidence. The confidence that is output by the deep neural network does not match the empirical accuracy on a test random sample.

In the example, the temperature scaling method is used for the calibration. This is described in Guo, C., Pleiss, G., Sun, Y., & Weinberger, K. Q. (August 2017), "On calibration of modern neural networks," Proceedings of the 34th International Conference on Machine Learning, Volume 70 (pp. 1321-1330), JMLR.org.

This means that the calibration is carried out after a training of model 104. After the calibration, the confidence of the network matches the empirical accuracy better than prior to the calibration.

In the example, a difference of the two classes having the highest probability is formed as described in Luo, Tong, et al., "Active learning to recognize multiple types of plankton," Journal of Machine Learning Research 6 (April 2005): 589-613.

The difference between the two classes is used in the method as an acquisition function. This acquisition function is better and quicker than the formation of an ensemble average value, for example. The calibrated difference therefore yields better results.

The method is based on supervised learning. Training data including labels, i.e., annotations, are necessary for supervised learning. These annotations are used as target outputs to allow application of an optimization algorithm. Depending on the application, the creation of such a training data set is very complicated. The labeling of 3D sensor measurements, for example of point clouds that are deliverable by a radar or LIDAR sensor, is very complicated and requires expert knowledge. In addition, in the field of medical imaging it may be very complicated to obtain training data from digital images.

The parameters of model 104, i.e., the deep artificial neural network in the example, may be randomly initialized.

A set of unannotated data is provided in a step 202. The unannotated data include patterns, in the example digital images or their representation. A step 204 is subsequently carried out.

A subset for determining the annotated data is selected from the set of unannotated data in a step 204. The subset includes the acquired unannotated data for the active machine learning.

In a first iteration of the method, the subset is randomly selected from the set of unannotated data in step 204.

Preferably only data that are not already acquired for the subset in a previous iteration are selected from the unannotated data for the subset in step 204.

A step 206 is subsequently carried out.

Annotated data are provided in a step 206. The annotated data may be determined from the subset by manual, semi-automatic, or automatic annotation of unannotated data. For this purpose, for example the digital images are displayed and provided with a label by a human. Automated labeling methods are also usable.

A step 208 is subsequently carried out.

Model 104, the deep neural network in the example, is trained for a classification of the data in step 208 as a function of the annotated data. The training takes place, for example, with the aid of gradient descent methods, for example ADAM, by supervised learning using the annotated data from the subset.

A step 210 is subsequently carried out.

Model 104 trained in this way is calibrated in step 210, as a function of the annotated data, with regard to confidence for a correctness of the classification of the annotated data by the model. In the example, the confidence is defined as a function of at least one probability that the classification by the model is correct.

For example, at least one parameter of model 104 is calibrated as a function of an expected proportion of correct classifications for the annotated data and an empirical proportion of correct classifications of the annotated data.

In the example, the temperature scaling is used, a perfect calibration for an input X and label Y being indicated as $$P(\hat{Y} = Y \mid \hat{P} = p) = p, \forall\, p \in [0.1]$$

where $\hat{Y}$ is a classification and $\hat{P}$ is the confidence associated with same.

The expected proportion of correct classifications is indicated by an expected value thereof. The empirical proportion of correct classifications is determined as a function of the annotated data and their classification by model 104. For the calibration, the parameters of model 104, i.e., of the deep neural network, are determined which minimize an expected calibration error indicated below:

$$E(|P(\hat{Y} = Y \mid \hat{P} = p) - p|)$$

A step 212 is subsequently carried out.

The confidence for the correctness of the classification of the unannotated data is determined for unannotated data in step 212, using the model calibrated in this way.

The unannotated data for the active machine learning whose confidence satisfies a criterion are acquired from the unannotated data.

In the example, active learning is used according to the "breaking ties" approach in order to improve the confidence of the multiclass classification. Accordingly, an $\text{argmax}_p P(p)$ is associated with a class designation x in such a way that P(a) indicates the highest probability and P(b) indicates the second-highest probability for a class a or a class b, respectively. In this case, the data for which the difference between P(a) and P(b) is smallest are eliminated from the unannotated data.

For a sample from the unannotated data, the criterion defines two classes, in the present case class a and class b, which have the highest probability, P(a) and P(b) in the present case, compared to the other classes into which the sample is classifiable by the model. The samples for which a difference between the probabilities of two classes, difference P(a)–P(b) in the present case, exceeds a threshold value are acquired from the unannotated data. The threshold value may be defined as a function of the probabilities for the other of the classes. For example, the threshold value is defined by a difference between the probabilities of two classes, which are compared to difference P(a)–P(b) between highest probability P(a) at that moment and second-highest probability P(b) at that moment.

Model 104 is preferably iteratively trained and calibrated. A check may be made in a step 214 as to whether an abort criterion is satisfied, and the active machine learning is ended when the abort criterion is satisfied.

This means that in the example, steps 202 through 214 are carried out repeatedly in this order or in some other order.

The abort criterion may define a reference for an accuracy of the classification of annotated or unannotated data by the model. The abort criterion is satisfied, for example, when the accuracy of the classification reaches or exceeds the reference.

The calibration of the deep neural network may be checked, for example, when high-quality annotated data are present. For example, the confidence of the deep neural network, for example 0.8, is compared to the empirical accuracy. For a correct calibration, this would be 80% correct predictions, for example.

Different acquisition functions may be used for a given network architecture. These acquisition functions may be compared by determining which set of training data is necessary for achieving a certain accuracy.

What is claimed is:

1. A computer-implemented method for active machine learning, the method comprising the following steps:
   providing annotated data;
   training a model for a classification of data as a function of the annotated data, wherein the model is a deep neural network;
   calibrating the trained model as a function of the annotated data, with regard to confidence for correctness of the classification of the annotated data by the trained model;
   determining, for unannotated data, the confidence for correctness of a classification of the unannotated data using the calibrated trained model; and
   acquiring, from the unannotated data, those of the unannotated data for the active machine learning whose confidence satisfies a criterion, wherein, for the calibrating, at least one parameter of the model is calibrated as a function of an expected proportion of correct classifications for the annotated data and an empirical proportion of correct classifications of the annotated data, and wherein the calibrating is performed based on the expected proportion being compared to the empirical proportion.

2. The method as recited in claim 1, further comprising:
   selecting a subset from the unannotated data; and
   determining the annotated data from the subset by manual, or semi-automatic, or automatic annotation of the subset.

3. The method as recited in claim 2, wherein the subset includes the acquired unannotated data for the active machine learning.

4. The method as recited in claim 1, wherein the confidence is defined as a function of at least one probability that the classification by the model is correct.

5. The method as recited in claim 4, wherein, for a sample from the unannotated data, the criterion defines two classes having a highest probability compared to other classes in which the sample is classifiable by the model, the samples for which a difference between the probabilities of the two classes exceeds a threshold value being acquired from the unannotated data.

6. The method as recited in claim 1, wherein the model is iteratively trained and calibrated, a check being made as to whether an abort criterion is satisfied, and the active machine learning being ended when the abort criterion is satisfied.

7. The method as recited in claim 6, wherein the abort criterion defines a reference for an accuracy of the classification of annotated or unannotated data by the model, the abort criterion being satisfied when the accuracy of the classification reaches or exceeds the reference.

8. The method as recited in claim 6, wherein the unannotated data are randomly selected in a first iteration of the method for a determination of the annotated data.

9. The method as recited in claim 2, wherein only data that are not already acquired for the subset are selected from the unannotated data for the subset.

10. A device for active machine learning, the device configured to:
    provide annotated data;
    train a model for a classification of data as a function of the annotated data, wherein the model is a deep neural network;

calibrate the trained model as a function of the annotated data, with regard to confidence for correctness of the classification of the annotated data by the trained model;

determine, for unannotated data, the confidence for correctness of a classification of the unannotated data using the calibrated trained model; and acquire, from the unannotated data, those of the unannotated data for the active machine learning whose confidence satisfies a criterion, wherein, for the calibrating, at least one parameter of the model is calibrated as a function of an expected proportion of correct classifications for the annotated data and an empirical proportion of correct classifications of the annotated data, and wherein the calibrating is performed based on the expected proportion being compared to the empirical proportion.

11. A non-transitory computer-readable storage medium on which is stored a computer program including computer-readable instructions for active machine learning, the instructions, when executed by a computer, causing the computer to perform the following steps:

providing annotated data;

training a model for a classification of data as a function of the annotated data, wherein the model is a deep neural network;

calibrating the trained model as a function of the annotated data, with regard to confidence for correctness of the classification of the annotated data by the trained model;

determining, for unannotated data, the confidence for correctness of a classification of the unannotated data using the calibrated trained model; and acquiring, from the unannotated data, those of the unannotated data for the active machine learning whose confidence satisfies a criterion, wherein, for the calibrating, at least one parameter of the model is calibrated as a function of an expected proportion of correct classifications for the annotated data and an empirical proportion of correct classifications of the annotated data, and wherein the calibrating is performed based on the expected proportion being compared to the empirical proportion.

* * * * *